June 18, 1935.  H. A. FISHER ET AL  2,005,519
METHOD AND APPARATUS FOR MAKING GLASS ARTICLES
Filed July 6, 1933   2 Sheets-Sheet 1
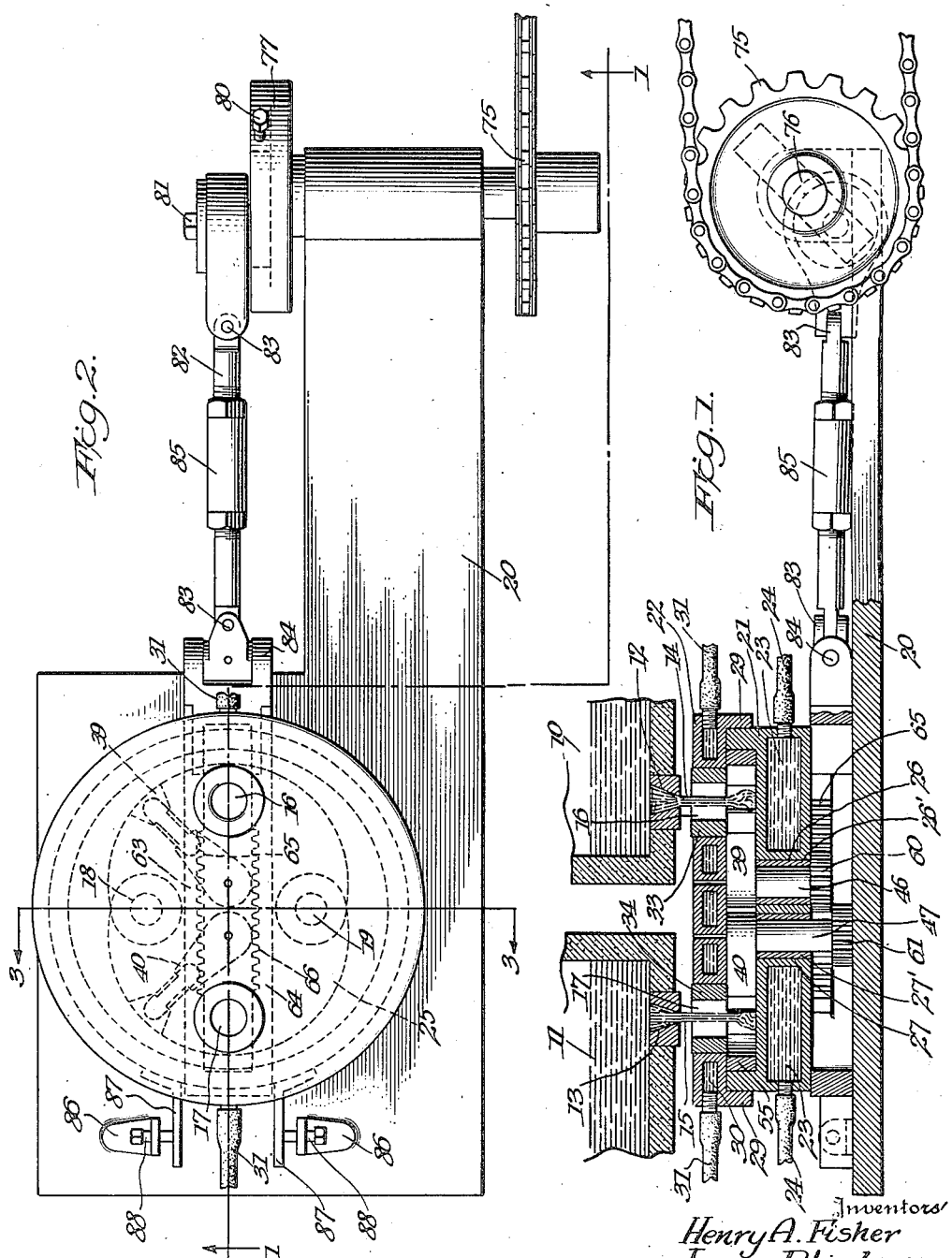
Inventors
Henry A. Fisher
James P. Lindsay

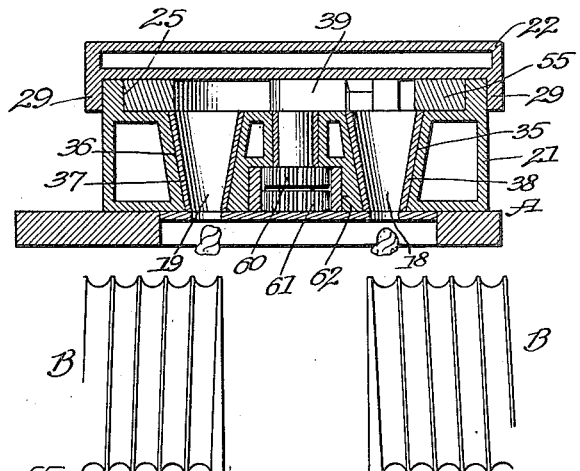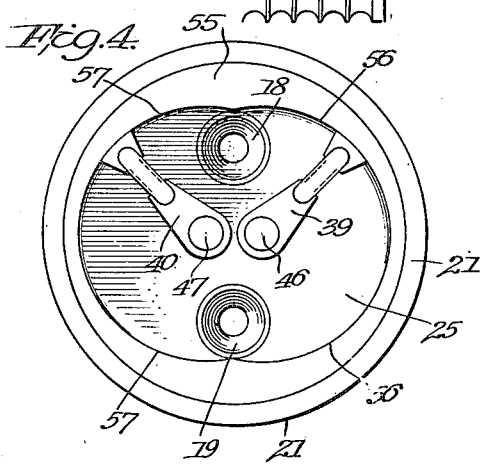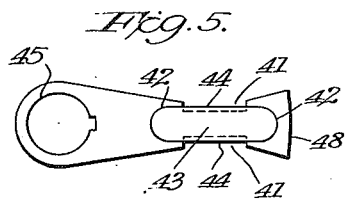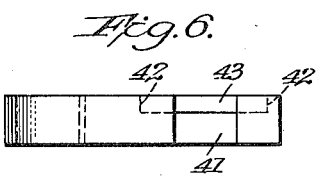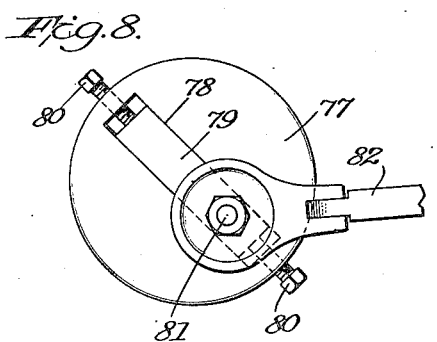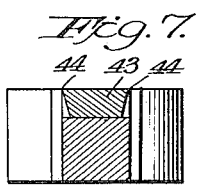
Inventors
Henry A. Fisher
James P. Lindsay Patented June 18, 1935

2,005,519

UNITED STATES PATENT OFFICE 2,005,519

METHOD AND APPARATUS FOR MAKING GLASS ARTICLES

Henry A. Fisher and James Presly Lindsay, Parkersburg, W. Va.

Application July 6, 1933, Serial No. 679,224

27 Claims. (Cl. 49—82)

The present invention relates to a method and apparatus for producing glass articles.

Marbles, and other glass articles have heretofore been produced by combining in a common melting tank glasses of different hue, or by combining the ingredient metals of different hue into a running stream, in either of which methods the variegated glass produced is cut into charges, and then subjected to suitable shaping devices.

The former method, if properly executed, will produce a glass article in which the various colors are fairly well defined in the product. However, this method is disadvantageous because it requires great care and constant attendance to insure that the ingredient bright colored metals do not too thoroughly merge in the melting tank, thus producing an article of drab appearance.

The latter method, in which the ingredient bright colored glasses are combined in a running stream, produces a product in which the colors blend together in a cloud-like manner, the line of definition between the colors not being clear.

The object of this invention is to produce a variegated glass article which is composed of different bright colored portions, the line of definition between which portions is quite clear.

Another object of this invention is to produce a variegated glass article which is composed of different colored portions, having an irregular yet clear line of definition between the colors.

Another object of this invention is to produce a variegated glass article in which the separate colors are clearly defined, and are of a substantial depth.

A further object of this invention is to produce such a variegated article of clear color definition, and yet one which is formed in such manner that there is no danger of the article fracturing along the line of junction of the ingredient bright colored metals.

Another object of the invention is to produce variegated marbles or other articles more rapidly than can be done with apparatus now in use and by the methods now followed.

A further object is to provide a movable apparatus which can be associated with ordinary glass tanks having no provision for mixing different glasses, and to utilize such conventional tanks in the production of variegated articles.

We have found that if the colored metals are produced in separate tanks, and gobs of said separate colored metals are joined after a very slight interval of time subsequent to being separated from the tanks, a variegated article of clear color definition will be produced. Furthermore, by joining the separate color sections of the article together when said sections are in the form of "gobs", an article results which has color depth, that is, the separate colored sections of the article are of a substantial thickness, thus resulting in the clear and full color. However, it is desirable in the practice of this invention that the colored gobs be severed and joined in practically a single operation, in order to prevent them from becoming so solid as to fracture along the line of color junction after they are formed and cooled. This is particularly desirable in making marbles, which are subjected to hard usage. Moreover, when this method is used in the production of marbles, the resulting multi-colored article presents the appearance of having been made by inlaying one colored portion into the other.

To practice this method, we have devised an apparatus which so operates that the separate bright colored gobs are in such a state of plasticity when joined that, though they form a structurally integral lump, the color line remains clear and well defined.

Other objects and advantages of the invention will be apparent from the following specification and drawings, in which drawings:

Fig. 1 is a longitudinal sectional view of the cutting and conveying mechanism, on line 1—1 of Fig. 2, showing the tanks of molten glass and the drive mechanism.

Fig. 2 is a plan view of the apparatus,

Fig. 3 is a transverse vertical sectional view on line 3—3 of Fig. 2, showing the shaping devices to which the lumps of variegated glass are fed, Fig. 4 is a plan view of the body casting of the apparatus, the top plate thereof being removed, Figs. 5, 6 and 7 are detail views of the cutting and conveying arms, and Fig. 8 is a detail view of the crank mechanism for operating the reciprocating rack bars of the apparatus.

In the drawings, and particularly in Figure 1, the numerals 10 and 11 designate separate melting tanks from which the ingredient metal or molten glass is delivered by the spouts 12 and 13, respectively, to the cutting and conveying mechanism hereinafter described.

The glass may be melted or fused from raw materials in the respective tanks, or cullet may be placed in the tanks and heated to fusion. In any case, the glass in each tank is preferably of a solid color, and different in color from the glass in the adjacent tank or tanks. However, if desired, variegated glass of different appearance could be melted in each tank, and then combined as hereinafter described.

By colored glass, we mean to include not only the bright colors, but white or black glass, or glass of any different characteristics or compositions which when combined, will make an article of variegated appearance.

The glass flows from the tanks 10 and 11 in streams as indicated at 14 and 15, respectively, and into the inlet orifices 16 and 17 of the cutting and joining device.

In Figure 3, the cutting and joining device is designated generally by the letter A, and letter B designates any of the well known types of shaping devices which press or form the lump of glass into the desired shape. In general, the cutting and joining device A cuts gobs of a single color from the streams of glass 14 and 15, joins said gobs into lumps, and passes said lumps through outlet orifices 18 and 19 (Fig. 4) to any suitable shaping devices B which are used to form and finish the lump into the desired shape.

The cutting and joining device is supported upon a base plate 20, and is composed of a body casting 21 and a top plate 22. The body casting is cylindrical in outer contour and is hollow to form a chamber 23 in which cooling water is circulated, the water entering and exiting by means of taps 24. The upper part of the body casting has a cylindrical recess 25 formed therein, within which the cutting and conveying arms operate in a manner which will be later described. The body casting has near its center and in diametrical line a pair of cylindrical apertures 26 and 27, and fitted in these apertures are suitable bushings 26' and 27', respectively.

The top plate 22 is circular in contour and is provided with a depending flange 29 at its periphery in order that it may fit over the body casting and cover the recess 25. The plate is hollowed to provide chambers 30 for circulation of a cooling medium, which enters and exits by means of taps 31.

The top plate is provided with a pair of apertures or inlet orifices 16 and 17 which are located in line along a diameter of the plate, each one being approximately midway between the center and outer edge of the plate. These apertures are fitted with suitable hollow bushings 33 and 34.

Referring again to the body casting 21, particularly as shown in Figure 3, said body casting has passing through it a pair of conical shaped passages or outlet orifices 19 and 18, and fitted within these passages are hollow conical bushings 37 and 38 respectively. These passages are located on a diameter of the body casting, and each one is approximately midway between the center of the casting and its peripheral edge, the line on which these passageways are located being approximately ninety degrees from the inlet orifices 16 and 17. It may thus be seen that glass fed into the cutting and joining mechanism may be conveyed circularly around in the body casting recess 25 and discharged through the outlet orifices 18 and 19.

Each cutting arm is provided with pockets 41 on its opposite side walls, the walls of the arms being inclined inwardly toward these pockets as shown in Figure 5. The upper surfaces of the arms are provided with recesses 42, and cutting bars 43 are fitted in these recesses. As shown in Figures 5 and 7, the side walls of the cutting bars are beveled inwardly and downwardly to form upper cutting edges 44. Apertures 45 are provided at the ends of the cutting and conveying arms into which extend the vertical operating shafts 46 and 47, respectively.

In Figure 4, the cutting and conveying arms are shown arranged for rotation within the chamber 25. Located within chamber 25 is a ring member 55, which is circular in outer contour, but the inner surface of which is described by two intersecting arcs 56 and 57, arc 56 being concentric with the axis of the shaft 46 while the arc 57 is concentric with the axis of the shaft 47. It is obvious from an inspection of Figure 5 that the outer cylindrical surfaces 48 of the cutting and conveying arms are in surface-to-surface contact with the arcuate surfaces 56 and 57.

The cutting and conveying arms 39 and 40 are keyed to the vertical shafts 46 and 47, respectively and these shafts pass through and are embraced by the bushings 26' and 27' in the body casting 21. Shaft 46 carries at its lower end a pinion 60, while at the lower end of shaft 47 a pinion 61 is carried. These pinions are located within a longitudinal channel 62 which passes through the body casting 21 (Figure 3), said channel being adapted to receive a pair of reciprocating bars 63 and 64. As is shown in Figures 1 and 3, pinion 60 is located in a plane above pinion 61, and to cooperate with said pinions to drive the cutting and conveying arms simultaneously in opposite directions the bars 63 and 64 are respectively provided with rack surfaces 65 and 66. Rack surface 65 is likewise located in a plane above rack surface 66, so that it will mesh with pinion 60, while rack surface 66 meshes with 61. In Figure 1, it is obvious that, if the rack bars are reciprocated from right to left, cutting and conveying arm 39 will be moved in a counter-clockwise direction, while cutting and conveying arm 40 will be moved in a clockwise direction.

Any suitable mechanism may be employed for reciprocating the rack bars 63 and 64, and we have shown them as driven by means of a rotating chain sprocket 75, which is mounted on one end of a shaft 76. On the opposite end of shaft 76 a disc 77 is fixed, said disc having in its outer surface a slot 78 in which the plate 79 may be adjusted longitudinally and fixed by means of set screws 80 passing through disc 77 into slot 78 and against the ends of plate 79. Disc 77 forms the crank for the rack bar reciprocating mechanism, and connected to plate 79 at 81 is the end of the connecting rod 82. The connecting rod is jointed at the points 83 and 84 to permit the rack bars to move rectilinearly in a single plane. Sections of the connecting rod 82 are joined by a turnbuckle 85. It is apparent that by adjusting the plate 79, the throw of the crank may be varied, thus adjusting the movement of arms 39 and 40. Furthermore, it is apparent that the connecting rod construction will permit smooth operation of the rack bars.

In Figure 2, an arrangement for adjusting the position of the inlet orifices 16 and 17 with respect to the flowing streams of glass is disclosed. This arrangement comprises a pair of brackets 86 secured to the bottom plate 20 and a pair of brackets 87 secured to the lower part of the body casting 21. Adjusting screws 88 are carried by brackets 86 and bear against brackets 87 so that a loosening of one and tightening of the other moves the entire casting with its covering to properly align the inlet orifices with the flow of glass.

Having described the apparatus, the manner of operation is as follows:—Uni-colored streams of glass 14 and 15 flow from the tanks 10 and 11, respectively, and into the inlet orifices 16 and 17, respectively, of the cutting and joining device A. While the streams of glass are flowing into the inlet orifices and thus into chamber 25, the cutting and conveying arms 39 and 40 are oscillating within chamber 25 in opposite directions. On the stroke of the reciprocating bars 63 and 64 from right to left, cutting and conveying arm 39 will move past inlet orifice 16 in a counter-clockwise direction, and the leading edge 44 of the cutting bar 43 will cut a gob of glass from the stream of glass 14, and will convey it in a counter-clockwise direction through chamber 25 toward the outlet orifice 18. Similarly, during reciprocation of the rack bars 63 and 64 from right to left, cutting and conveying arm 40 is moving in a clockwise direction, and as it passes by inlet orifice 17, the leading cutting edge of its cutting bar will cut a gob of glass from the stream 15, and in further movement, will convey this gob through chamber 25 toward the outlet orifice 18. The glass gobs during their passage through chamber 25 are cooled to such an extent that upon being joined, the color line will be clearly defined, and yet the gobs will be sufficiently plastic to form an integral lump not liable to fracture. Arms 39 and 40 are so arranged upon their respective shafts 46 and 47 that at the termination of one arcuate movement, said arms will meet above outlet orifice 18, at which time the gobs of uni-colored glass will be joined into a multi-colored lump.

At this point, which is the termination of the reciprocation of the rack bars from right to left, cutting and conveying arm 39 begins to move in a clockwise direction, while cutting and conveying arm 40 begins to move in a counter-clockwise direction as the reciprocating rack bars begin to move from left to right. The lump of multi-colored glass is thus released by the arms and drops through the outlet orifice 18 to the forming devices B.

As the reciprocating rack bars 63 and 64 move further from left to right, the arms 39 and 40 with their cutter bars 43 again move past the inlet orifices 16 and 17, respectively, this time traveling in the opposite directions. They again cut gobs of glass from the streams 14 and 15, respectively, as they move in this direction, and convey the gobs to outlet orifice 19, and at the termination of this stroke, the multi-colored lump formed as before is released through outlet orifice 19 to the forming devices B.

Obviously, it is within the scope of this invention to provide any number of inlet orifices in the cutting and conveying mechanism, depending on the number of different colors or compositions to be used in making the variegated article. Similarly any number of cutting and conveying arms may be used.

It will be observed that by the method of the present invention, articles formed of glass of different compositions or colors will be produced and, in which articles, the lines of color distinction will be sharply defined, yet, nevertheless, the different glasses will be permanently fused together.

It will be understood that the invention is not limited to the details of construction shown in the drawings and that the examples of the use of the apparatus and method which have been given do not include all of the uses of which the apparatus is capable or by which the method may be followed; also, that the phraseology employed in the specification is for the purpose of description and not of limitation.

We claim:—

1. The method of producing variegated glass articles which consists in separately melting glasses of different color, severing the glass of each color into gobs, and combining the gobs while in a plastic state to form a solid multi-colored article.

2. The method of producing variegated glass articles which comprises combining gobs of glass of different color into a multi-colored lump while in a plastic state, and forming said lump into a solid article.

3. The method of producing glass articles which consists in heating separate ingredient metals to a state of fusion, severing the separate ingredient metals into gobs, joining the gobs into lumps, and forming the lumps into solid articles.

4. In an apparatus for producing glass articles, the combination of means to supply molten glass of different compositions, means to form the glass supplied by said first named means into gobs, and to press the gobs into lumps.

5. In an apparatus for producing glass articles, the combination of a plurality of tanks including outlets, and a cutting mechanism adjacent the outlets from said tanks, said mechanism being adapted to sever gobs of glass from the outlets of said tanks, and join the gobs into lumps.

6. In an apparatus for producing variegated glass articles, in combination, a plurality of tanks including outlets, each tank containing glass of a different color, a cutting mechanism adjacent the outlets from said tanks, said mechanism being adapted to sever a gob of glass from the outlets of said tanks, and join the gobs into multi-colored lumps.

7. In an apparatus for producing variegated articles, the combination of a plurality of tanks containing glass of different compositions, said tanks being provided with outlets, means for severing the glass adjacent the outlet of each tank into gobs, and means for pressing the gobs into multi-colored lumps.

8. In an apparatus of the class described, the combination of a plurality of sources of molten glass, each source supplying glass of a different composition, a single means to form the glass received from one of said sources into a gob and to move said gob toward another of said sources, and means associated with said last named source to join the glass received therefrom with the gob from said first source.

9. In an apparatus for producing glass articles, the combination of a plurality of tanks containing the ingredient metals, means for severing said metals into gobs and for pressing the gobs into lumps.

10. In an apparatus for producing glass articles, the combination of a plurality of tanks of glass each having an outlet orifice, and a device positioned adjacent said orifices for cutting into gobs and joining into lumps the glass from the tank orifices.

11. In an apparatus of the character described, the combination of a plurality of tanks of glass having flow orifices therefrom, a casing having a plurality of inlet orifices and an outlet orifice, a plurality of cutting and conveying arms, and means for operating said arms to cut gobs of glass at the inlet orifices and join the gobs at the outlet orifices.

12. In a device of the character described, the combination of means to produce a plurality of streams of glass, a plurality of cutting and conveying arms, means for operating said arms to cut gobs of glass from the streams, and for joining said gobs into lumps.

13. In an apparatus for producing variegated glass articles, the combination of a plurality of tanks containing glass of different color, means for forming said glass into gobs and for pressing the gobs into lumps.

14. In an apparatus of the class described, the combination of a plurality of sources of molten glass of different compositions, means movable with respect to said sources to receive gobs of molten glass therefrom to join the gobs into lumps and to deliver the lumps to a point of disposal.

15. The method of producing variegated glass articles which consists in separately melting glasses of different color, severing the glass of each color into gobs, and immediately combining the gobs while in a plastice state to form a multi-colored article.

16. The method of producing variegated glass articles which consists in separately melting glasses of different color, severing the glass of each color into gobs, and combining the gobs while in a shapeless plastic state to form a multi-colored article.

17. The method of producing variegated glass articles which comprises combining gobs of glass of different color into a multi-colored lump while in a shapeless plastic state, and subjecting said lump to the action of forming devices.

18. The method of producing glass articles, which consists in heating separate ingredient metals to a state of fusion, severing the separate ingredient metals into gobs, immediately joining the gobs into lumps, and subjecting the lumps to the action of forming devices.

19. The method of producing glass articles, which consists in heating separate ingredient metals to a state of fusion, severing the separate ingredient metals into gobs, joining the gobs into lumps while said gobs are in shapeless condition, and subjecting the lumps to the action of forming devices.

20. The method of producing glass articles, which consists in heating separate ingredient metals to a state of fusion, severing the separate ingredient metals into gobs, immediately joining the gobs into lumps while said gobs are in shapeless condition, and subjecting the lumps to the action of forming devices.

21. The method of producing variegated glass marbles which consists in separately melting glasses of different color, severing the glass of each color into gobs, combining the gobs while in a plastic state into lumps, and shaping the lumps into solid spherical articles.

22. The method of producing variegated glass marbles which comprises combining gobs of glass of different color into a multi-colored lump while in a plastic state, and shaping said lump into a solid spherical article.

23. The method of producing glass marbles which consists in heating separate ingredient metals to a state of fusion, severing the separate ingredient metals into gobs, joining the gobs into lumps, and shaping the lumps into solid spherical bodies.

24. The method of producing variegated glass marbles which comprises joining gobs of plastic glass of different colors into a multi-colored lump after the gobs have solidified to such an extent that the line of color demarcation in the lump will be clearly defined, and shaping the lump into a solid spherical article.

25. The method of producing variegated glass articles which consists in separately melting glasses of different color, severing the glass of each color into gobs, pressing the gobs together while in a plastic state to form a lump, and shaping the lump into a multi-colored article.

26. The method of producing variegated glass articles which comprises pressing gobs of glass of different color into a multi-colored lump while in a plastic state, and subjecting said lump to the action of shaping devices.

27. The method of producing glass articles which consists in heating separate ingredient metals to a state of fusion, severing the separate ingredient metals into gobs, pressing the gobs into lumps, and subjecting the lumps to the action of shaping devices.

H. A. FISHER.
J. P. LINDSAY.